S. W. CRAMER & W. B. HODGE.
AIR CONDITIONING APPARATUS.
APPLICATION FILED DEC. 14, 1909.

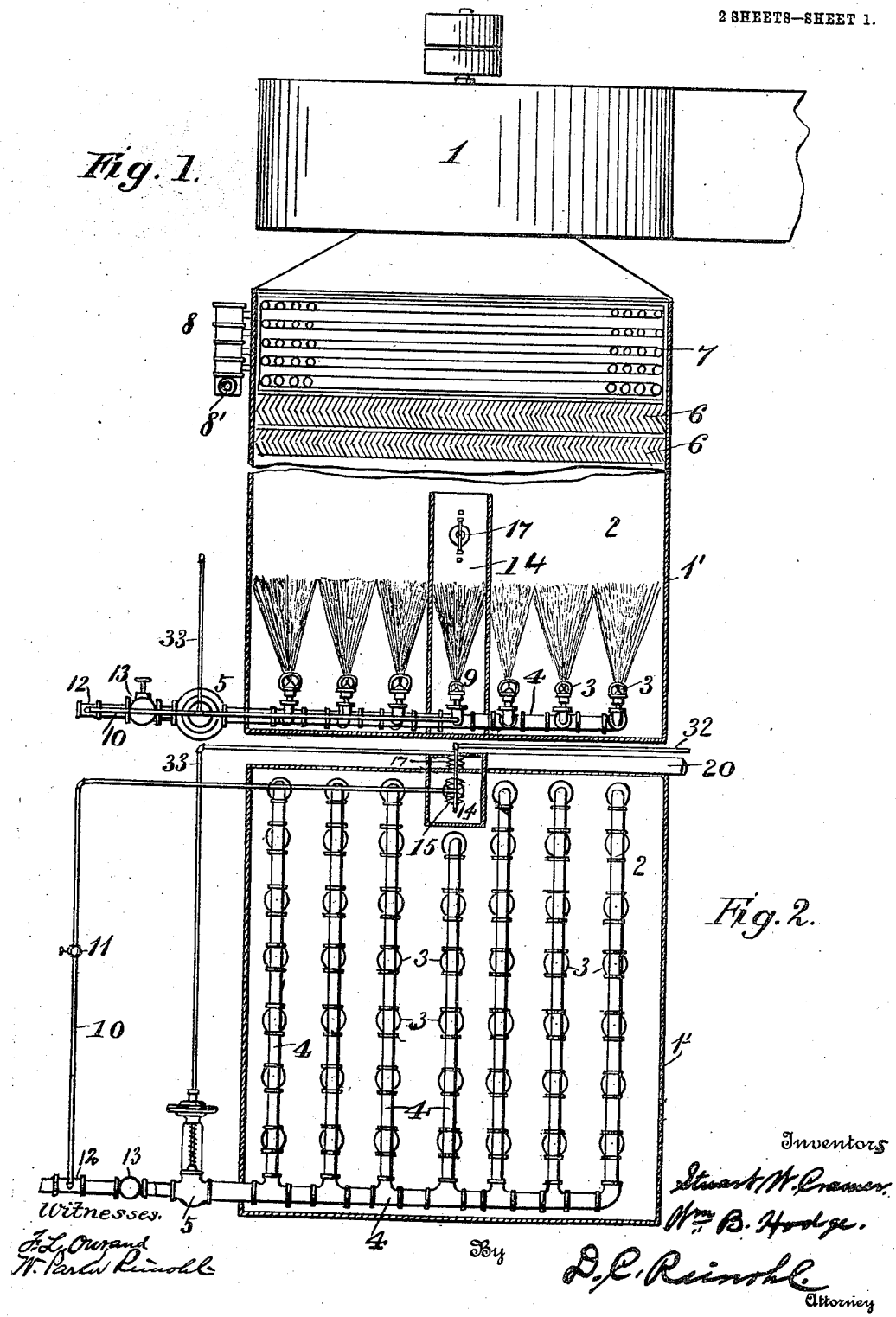

960,830.

Patented June 7, 1910.

2 SHEETS—SHEET 2.

UNITED STATES PATENT OFFICE.

STUART W. CRAMER AND WILLIAM B. HODGE, OF CHARLOTTE, NORTH CAROLINA; SAID HODGE ASSIGNOR TO SAID CRAMER.

AIR-CONDITIONING APPARATUS.

960,830.  Specification of Letters Patent.  Patented June 7, 1910.

Application filed December 14, 1909. Serial No. 533,037.

*To all whom it may concern:*

Be it known that we, STUART W. CRAMER and WILLIAM B. HODGE, citizens of the United States, residing at Charlotte, in the county of Mecklenburg and State of North Carolina, have invented certain new and useful Improvements in Air-Conditioning Apparatus; and we do hereby declare the following to be a full, clear, and exact description of the invention, such as will enable others skilled in the art to which it appertains to make and use the same.

This invention relates to apparatus for treating air, whereby the air is cleansed of its impurities and is conditioned by the addition or subtraction of moisture and heat as may be desired, and the automatic regulation of the humidity of the atmosphere in a factory or compartment thereof.

The object of this invention is to provide a new arrangement of parts whereby ventilating and heating systems can be more accurately and scientifically controlled than heretofore, and the invention consists in modifications of parts and new adaptations of the constructions shown in some previous patents and applications for patents of Stuart W. Cramer, and will be fully disclosed in the following specification and claims.

Figure 3:
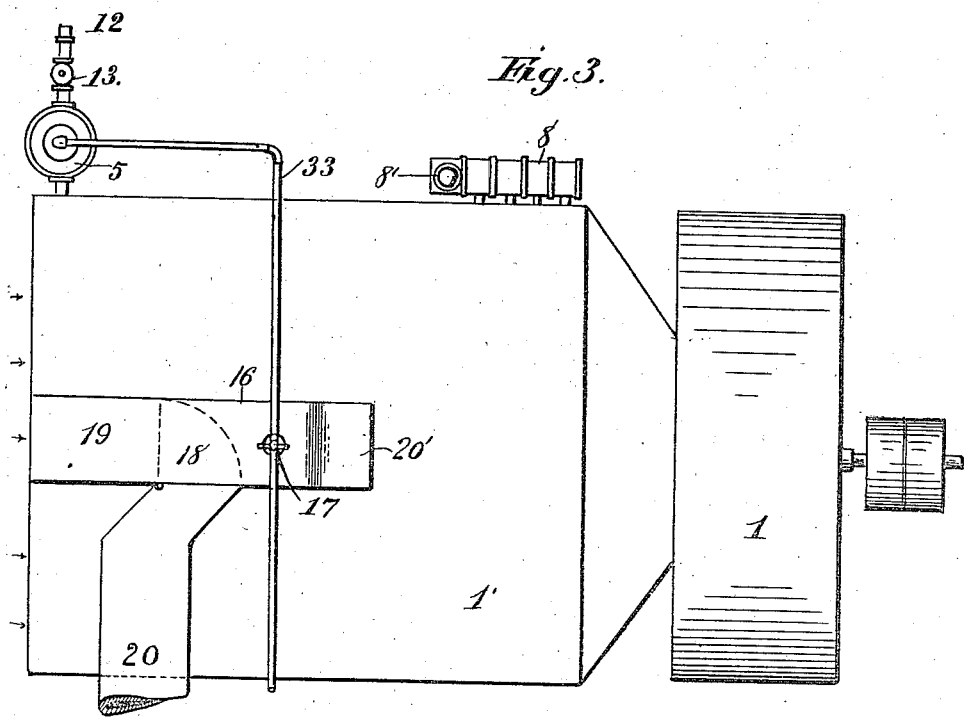
Figure 4:
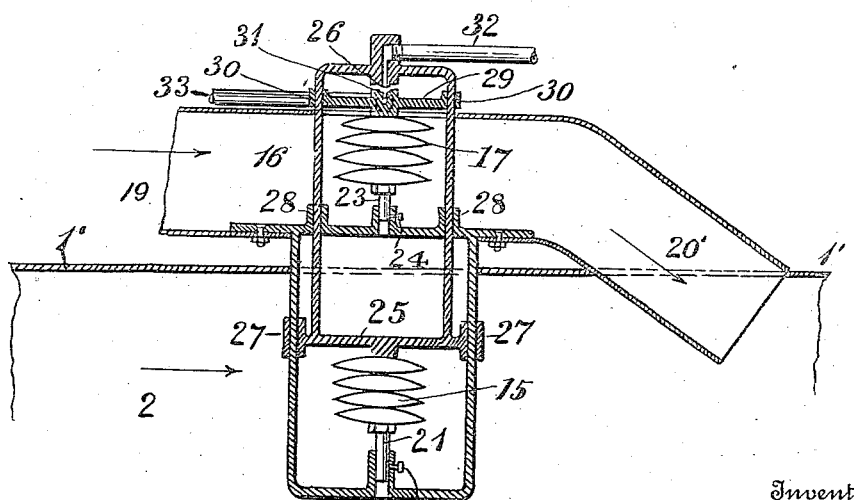

In the accompanying drawings, which form part of this specification:—Figure 1 represents a sectional plan view of our improved apparatus. Fig. 2 represents an elevation of the same. Fig. 3 represents a plan view of the same; and Fig. 4 represents a sectional elevation of the regulator detached and on an enlarged scale.

Reference being had to the drawings and the designating numerals thereon, 1 indicates a fan such as is ordinarily used in heating and ventilating systems. 1' a casing. 2 a spray chamber through which the fan draws air from any desired external source. At the entrance of the spray chamber are a series of nozzles 3, arranged to be supplied with water through suitable pipes 4. In the main supply pipe is an automatically operated valve 5, by means of which this water supply to the nozzles can be regulated as will be hereinafter described. Also included in the spray chamber 2, are baffle plates 6, 6, which act to arrest, separate, or condense the coarse spray carried along by the air and allow only the saturated air, without any free moisture to pass through.

7 indicates steam heater coils connected to a manifold 8, to which steam may be supplied by pipe 8' for heating the air as it passes over the coils 7 and before it enters the fan.

9 indicates an auxiliary nozzle continuously supplied with water from a pipe 10, which is connected through a valve 11 to the water supply pipe 12. This connection is made in front of the valve 5 so that the spray nozzle 9 is always in operation as long as there is any water pressure maintained in the supply pipe 12, regardless of whether or not valve 5 is closed.

13 indicates an auxiliary hand valve in the supply pipe 12 in front of water shut-off valve 5.

14 is an auxiliary spray chamber which is kept constantly supplied with spray from the nozzle 9, and in which is a wet bulb member 15 of a regulating device to be hereinafter described.

16 indicates an auxiliary chamber above the casing 1', in which is a dry bulb member 17, of the same regulating device.

18 indicates a hinged damper in chamber 16 whereby the current of air drawn into chamber 16 by the fan 1 can be taken from a selected source, viz: opening 19, or in other words, the same air that is supplied to the spray chamber 2; the damper 18 being arranged to take air from this supply; or by turning damper 18 through an angle of 90 degrees as indicated by the dotted lines, this source of supply is closed and the air is now drawn from source of supply 20, which may be a room in the building or any other preferred location. This air after passing dry bulb member 17 passes down through a pipe 20', leading into the main spray chamber 2, as shown in Fig. 2, and is then mixed with the air passing through it.

Referring especially to Fig. 4, 15 indicates a thermostat or wet bulb member of any desired type which expands and contracts under differences in temperature. 17 indicates a dry bulb thermostat.

15 is supported on a stud 21, adjustable by means of set screw 22. Likewise thermostat or dry bulb member 17, is supported on stud 23, adjustable by means of a set screw 24. The expansion and contraction of wet bulb member 15 is transmitted through a frame or stirrup 25, to a valve 26, at the top of the frame. The movement of this frame is guided by bearings 27 and 28. The expansion and contraction of dry bulb member 17 is transmitted to a cross arm 29, which is guided on frame 25 by bearings 30 and is provided with a valve seat 31, corresponding to valve 26, and into which seat valve 26 fits.

32 indicates a supply pipe for compressed air from any convenient source and 33 represents a pipe leading to the top of the automatic water shut-off valve 5 of well known construction. It is evident that when wet bulb member 15, expands, due to increase in temperature, the frame 25 will rise and the valve 26 will open and air from pipe 32 will escape as well as the air from pipe 33. This same action occurs when dry bulb member 17, contacts, due to a lowering of its temperature. On the other hand, if dry bulb member 17 expands while wet bulb member 15, remains the same, cross bar 29, will rise and the members 26 and 31 will seat and compressed air from the source of supply 32, will flow into pipe 33, and thence down into the automatic water shut-off valve 5. If the members 15 and 17 expand and contract at the same rate, there will be no change in the relative positions of the valve 26 and seat 31, and pipe 32 will remain full or empty of air as the case may be. If, on the other hand, either 15 or 17 move at any but the predetermined rate, the valve will tend to open and close, as the case may be.

The operation of the apparatus is as follows: The fan 1, driven by any preferred source of power, draws air from any desired source through the spray chamber 2. As the air enters the spray chamber it is thoroughly saturated and washed by means of the water spray under pressure issuing from the nozzles 3. This washed air surcharged with moisture passes between the baffle plates 6, 6, which act to arrest, separate or condense the free particles of water. The air now passes through the heater coils 7, which have hot water or steam admitted to them as occasion requires, and this air is then drawn through the fan and forced out into the duct leading to the various room outlets. The nozzle 9, is continuously supplied with water under pressure and thereby continuously saturates the air passing through compartment 14. The wet bulb member 15, therefore is maintained at the wet bulb temperature, or, in other words, the temperature of evaporation, and the air which is drawn through that compartment depends upon the position of the damper 18. If damper 18 occupies the position shown in full lines in Fig. 3, the wet bulb member 15, will be at the temperature of evaporation of the incoming air supplied to the spray chamber 2. On the other hand, if the damper 18, is turned through an angle of 90 degrees as shown in dotted lines, the wet bulb member 15 will be at the temperature of evaporation of the air entering through pipe 20, which can be taken from any desired source; for instance, one of the rooms into which the fan 1, is delivering washed and moistened air. The dry bulb member 17, is actuated by the temperature of the air entering spray chamber 2, or if damper 18, is turned as shown by the dotted lines in Fig. 3, it can be made to take air from any desired source of supply just as in the case of the previously described wet bulb member. Air is induced across this dry bulb member by means of the suction of the fan 1 and passages 16, entering the back part of the spray chamber through pipe 20. In order to maintain any desired humidity in a room, stud 23 is raised and clamped by means of set screw 24 so that when the differences in temperature between the wet bulb member and the dry bulb member represents the humidity desired the valve seat 31 rises and engages the valve 26 thereby cutting off the supply of compressed air through pipe 32. When the humidity of the air passing dry bulb member 17 and wet bulb member 15 becomes lower that the point at which the regulator is set, either the dry bulb member 17, expands, closing the valve 26, or the wet bulb member 15, contracts, which accomplishes the same purpose by drawing down the valve 26 upon its seat 31. With this valve seat closed compressed air from pipe 32 flows down through pipe 33 into the automatic water valve 5 which opens and allows water to flow into the nozzles 3, producing spray as heretofore described. The humidity therefore, will begin to rise and the air passing across the dry and wet bulb members will have a greater amount of moisture in it and therefore the difference between the wet and dry bulb member will begin to decrease. This change acts either to raise the wet bulb member 15 or to lower the temperature of the dry bulb member 17, both, thereby opening the valve 26 allowing the air from 32 to escape and also to bleed the automatic water valve 5, thereby cutting off the water spray. It is therefore evident that either the wet bulb member or the dry bulb member, or both, can be set to an initial difference which will correspond to some humidity, and as the two members work in conjunction, the water will be turned off and on the spray heads, as humidity conditions of the room require. By providing wet bulb member 15, with a greater or less amount of expansible material it is evident that this member can be made to expand at a greater or less rate than dry bulb member 17. Therefore this combination lends itself to maintaining a variable rate of change or a variable difference at different temperatures, so that it is possible to maintain a variable degree of humidity depending upon the temperature. It is therefore evident that at a high temperature of 90 degrees Fahrenheit we can have a humidity of say 60%, while at 60 degrees we can maintain a humidity of 50%, or vice versa, as conditions may require.

We are aware that dry bulb members have heretofore been supplied with air from a source other than that supplied to the main spray chamber, but in connection with such method of regulation, so far as we know there has never been any attempt made to automatically regulate the water supplied to the nozzles in the spray chamber, and it is evident that such method of control would be inoperative, because when the spray is cut off from the spray chamber it would at the same time be cut off from the wet bulb member whose temperature would no longer be that of evaporation. By maintaining the wet bulb member continuously at the temperature of evaporation we can regulate the main sprays and thereby introduce either moistened or dry air into the room as the occasion requires. Furthermore, by having the source of air to the wet and dry bulb members under control we are able to maintain the humidity in any desired location at exactly the desired point.

It is obvious that changes in form and construction of the apparatus may be made without departing from the spirit of our invention.

Having thus fully described our invention, what we claim is—

1. In a humidifier, a spray chamber, means for intermittently supplying spray to the spray chamber, a humidity controlling device, and means for continuously supplying saturated air to said controlling device.

2. In a humidifier, a main spray chamber, an auxiliary spray chamber, means for intermittently supplying spray to the main spray chamber, a humidity controlling device in the auxiliary spray chamber, and means for continuously supplying saturated air to said controlling device.

3. In a humidifier, a main spray chamber, an auxiliary spray chamber, means for supplying spray to said chambers, a humidity controlling device in the auxiliary chamber and means actuated by said controlling device to intermittently supply spray to a main chamber.

4. In a humidifier, a spray chamber, a humidity controlling device comprising a wet and a dry member, means for supplying saturated air continuously to said wet member, and means actuated by said humidity controlling device arranged to intermittently supply spray to the spray chamber.

5. In a humidifier, a main spray chamber, means for intermittently supplying spray to the spray chamber, an auxiliary spray chamber provided with a humidity controlling device having a wet and a dry member, and means for supplying saturated air continuously to said controlling device, and means for controlling the air supply to the spray chambers.

6. In a humidifier, a spray chamber, means for intermittently supplying spray to the spray chamber, an auxiliary spray chamber provided with a humidity controlling device, and means for determining the source of air supplied to said auxiliary chamber.

7. In a humidifier, a spray chamber, means for intermittently supplying spray to the spray chamber, an auxiliary spray chamber, a humidity controlling device comprising a wet and dry member inclosed in said auxiliary spray chamber, means for continuously supplying either member of the humidity controlling device with air from a different source than that supplied to the main spray chamber.

8. In a humidifier, a spray chamber, means for intermittently supplying spray to the spray chamber, an auxiliary spray chamber, a humidity controlling device comprising a wet and dry member inclosed in said auxiliary spray chamber, means for continuously supplying both members of the humidity controlling device with air from a different source than that supplied to the main spray chamber.

In testimony whereof we affix our signatures, in presence of two witnesses.

STUART W. CRAMER.
WILLIAM B. HODGE.

Witnesses:
W. C. ELLIOTT,
JNO. C. WATSON.